Aug. 11, 1964    N. P. ROBIE    3,143,895
DEVICE FOR TRANSMITTING MOTION
Filed July 16, 1962    3 Sheets-Sheet 1

INVENTOR.
Norman P. Robie,
BY
ATTORNEYS.

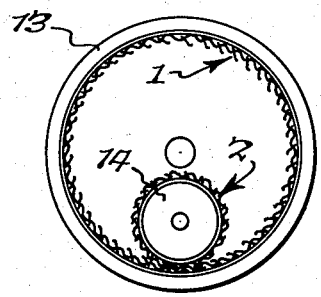
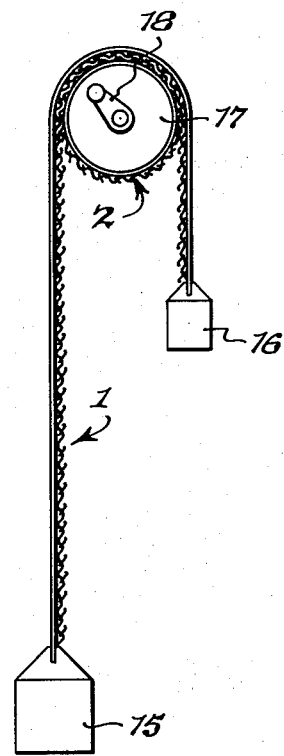
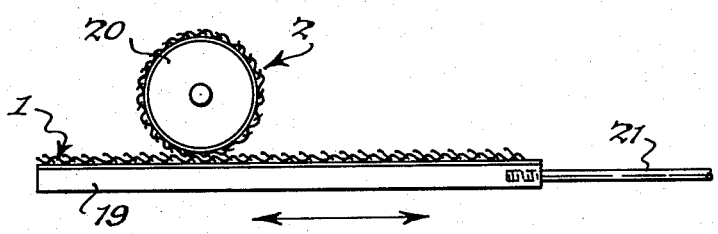

INVENTOR.
Norman P. Robie
BY
ATTORNEYS.

United States Patent Office 3,143,895
Patented Aug. 11, 1964

3,143,895
DEVICE FOR TRANSMITTING MOTION
Norman P. Robie, Hamburg, N.Y., assignor to Electro Refractories & Abrasives Corporation, Buffalo, N.Y.
Filed July 16, 1962, Ser. No. 209,992
8 Claims. (Cl. 74—229)

This invention relates to a method of transmitting motion and more specifically to the transmission of power by hook and pile fabrics on the surfaces of belts, pulleys and slabs.

The transmission of power by belts, pulleys, gears and friction devices is well known to the mechanical arts.

The object of this invention is to provide transmission of power by interlocking hook and pile fabrics.

Another object of this invention is to provide transmission of power between shafts not in the same plane.

Another object of this invention is to provide a means of transmitting power intermittently.

Another object of this invention is to provide a means of multiple power take off from a single power source.

Another object of this invention is to provide a combustible or expendible means of power transmission which would burn away after imparting starting force to a projectile for example.

My invention is particularly useful where the power to be transmitted is fractional horsepower and especially for experimental or home workshop purposes where the ability to throw together working units with simple roughly spaced pulleys and discs with belt drives obviates the necessity for precise machining and spacing of the components which would be required by more conventional drives. The positive yet continuously variable drives which my device offers are believed to be entirely unique in small power devices.

A basic part of this invention is to use interlocking hook and pile fabric to engage two or more moving elements. This hook and pile fabric is not my invention and not of my manufacture but is such as that manufactured as a fastener and sold under the trade name "Velcro." This is produced by American Velcro, Inc., and distributed by Tobler, Ernst & Traber Inc., 71 Murray Street, New York 7. The fastening principle is similar to a burr clinging to cloth. The hook fabric is made by precision weaving, heat setting and cutting to produce many heat-set, semi-rigid nylon hooks per sq. in. These hooks pressed into a pile fabric capable of engaging with these hooks result in a strong fastening which can be attached and detached thousands of times by simply pressing the fabrics together and pulling them apart as desired.

I have discovered that these hook and pile fabrics can be cemented to moving elements to transmit power to basic mechanical movements. The hook and pile fabrics in this case act like meshing gears or friction elements in transmitting power. One of the fabrics for example the "pile" fabric can be cemented to belts, pulleys, discs or reciprocating parts which are to be driven and the other or "hook" fabric to other belts, pulleys, discs or reciprocating parts which provide the driving force. When the belt, pulley or reciprocating part rotates or moves, it continuously or intermittently engages and disengages the other fabric cemented to belts, pulleys, discs or reciprocating parts much in the manner that gears or a rack and pinion for example engage when in motion. For a clearer understanding of this invention refer to the drawings which illustrate some applications of this invention.

In the drawings submitted herewith to illustrate various applications of my invention:

Figure 9:
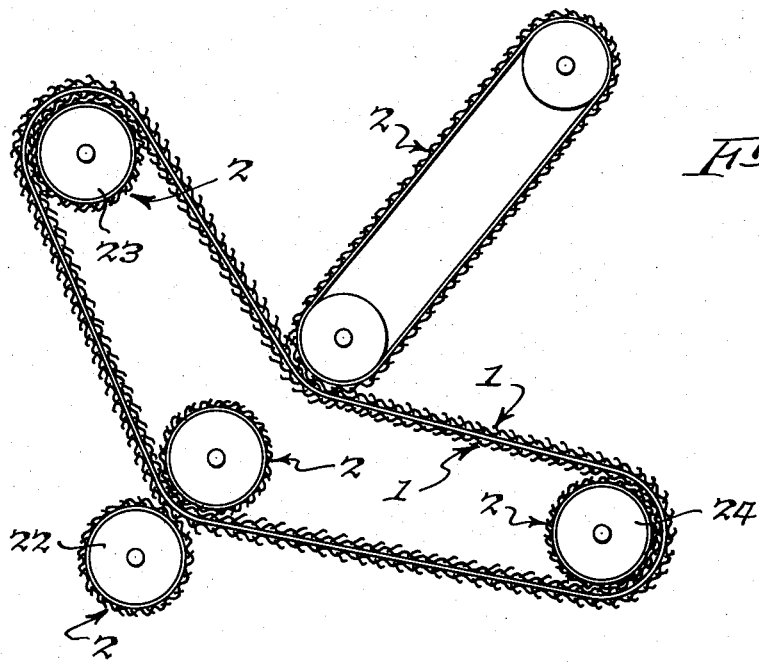
Figure 10:
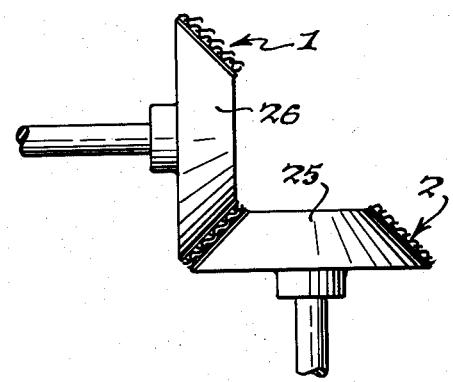
Figure 11:
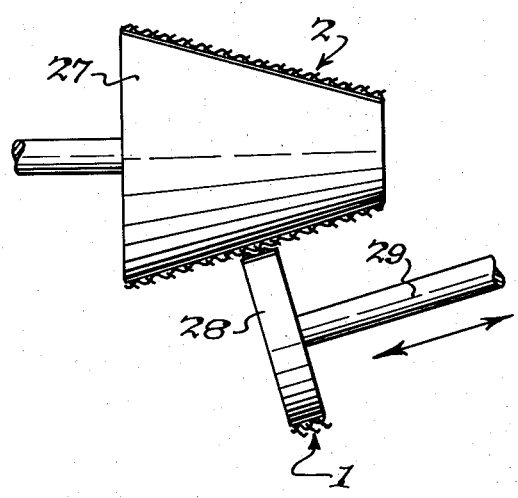

FIG. 6 shows the application of my principle using a rotating rigid ring to drive a pulley internal thereto, FIG. 7 shows a strip of hook fabric used to drive a clock mechanism by weights hung thereon, FIG. 8 shows a rack and pinion type of application of my invention, FIG. 9 illustrates a belt coated on both sides with hook fabric used to drive pulleys on both sides thereof, FIG. 10 shows transmission of power between two shafts at right angles to one another, FIG. 11 shows the application of my device in a variable speed drive.

Figure 1:
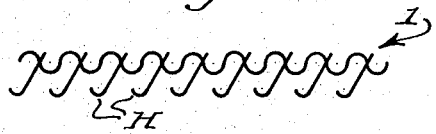
FIG. 1 shows diagrammatically a piece of hooked fabric.
Figure 2:
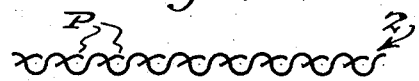
FIG. 2 shows diagrammatically a corresponding piece of pile fabric.

In FIG. 1 I show diagrammatically a piece of hooked fabric 1 having hooks H extending downwardly from one face of the fabric to interlock with the pile loops or threads P of the pile fabric 2 shown in FIG. 2.

Figure 3:
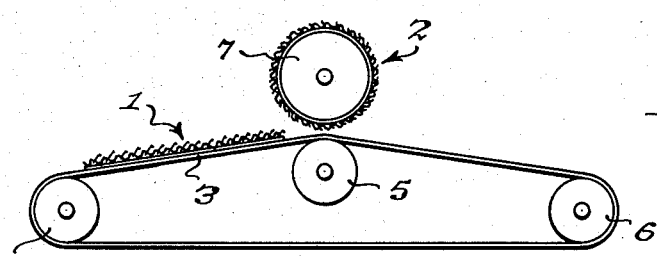
FIG. 3 shows an intermittent drive device.

The device shown in FIG. 3 was actually a test machine built to illustrate my invention of an intermittent drive. Hook fabric 1 was cemented to one face of a canvas belt 3 for only a part of the length of the belt. This belt was driven by a pulley 4 in continuous contact therewith and was supported also by pulley 5 and idler pulley 6 to keep the belt under tension. Another pulley 7 was coated round its entire peripheral surface with pile fabric 2 and this pulley spaced far enough from belt 3 so that it would be driven only during the time that hook fabric 1 was adjacent to it. This device was run for 60 hours with wheel 7 making 36 revolutions per min. for a total of 129,600 revolutions. The fabrics were still in good condition and could have been run for a much longer period of time.

Figure 4:
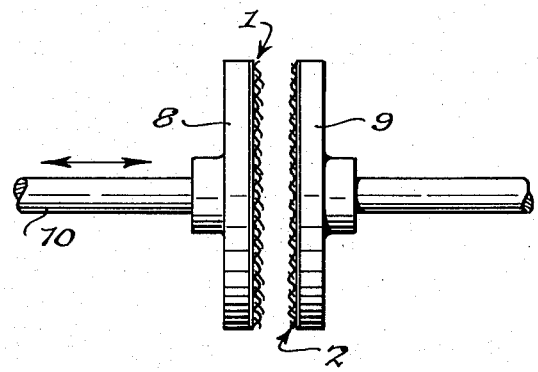
FIG. 4 shows a clutch faced with fabrics in accord with my invention.

FIGURE 4 shows a clutch mechanism where the hook and pile fabric covered discs cemented to faces of clutch members 8 and 9 can be pushed together or pulled apart by sliding of shaft 10 to start or stop power transmission.

Figure 5:
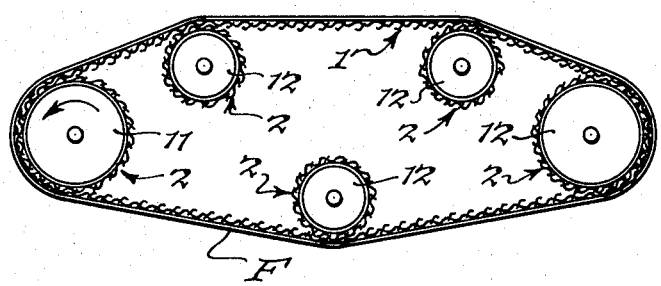
FIG. 5 shows a plurality of shafts driven by a belt faced with a hook fabric.

FIGURE 5 shows a belt F covered internally with hook fabric to drive a plurality of pile covered pulleys 12 inside the belt, power being brought into the system by pile covered drive pulley 11.

FIGURE 6 shows a rotating rim 13 driven by means not shown and covered on its inside circumference with hook fabric 1 driving a pulley 14 covered with pile fabric 2.

FIGURE 7 shows a strip of hook fabric with unequal weights 15 and 16 hung on its two ends. The hook fabric 1 engages a pile fabric 2 fastened to pulley 17 which may be used to drive the mechanism of a grandfather's clock. To wind the clock the heavier weight can be raised to the high position by turning crank 18, suitable ratchets (not shown) being provided between pulley 17 and the clock mechanism.

FIGURE 8 shows a strip 19 of wood or metal covered with hook fabric 1. The pulley 20 is covered with pile fabric 2 which engages hook fabric 1. As the strip 19 oscillates back and forth due to force applied through member 21 the rotation of pulley 20 reverses much in the manner of a rack and pinion gear movement.

FIGURE 9 shows a belt with hook fabric on both sides so it can drive a complex arrangement of pile covered belt and pulleys using power supplied by pulley 23. Since the meshing of the hooks in the pile is not as precise or exacting as the meshing of gears it is possible to have the axes of the pulleys not exactly in the same plane. For example the axis of pulley 22 does not have to be exactly in the same plane as that of the pulley 24 nor of other pulleys in the system.

FIGURE 10 shows cones covered with hook and pile fabrics in order to supply rotation of a driven member 25 having its axis at a right angle to the axis of the driving member 26.

FIGURE 11 shows a variable speed device using hook and pile fabric in which the speed of rotation of wheel 27 is controlled by moving drive wheel 28 lengthwise along its axis 29.

Not shown is a rotating disc driving a pulley through engagement of hook and pile fabric. This can also be a variable speed device.

Where a hook fabric is shown in the illustrations I may substitute a pile fabric if the pile fabric shown is substituted with a hook fabric. One hook fabric may engage another opposing hook fabric or any other fabric capable of engaging therewith. However in general I arrange that my hook fabric shall engage an adjacent pile fabric. The driving force may be applied through either the hook or the pile element within the scope of my invention though I usually drive with the hook fabric since the hooks are somewhat more robust than the pile loops. Obviously the principal movement of my various members is to be roughly parallel to the surfaces of the fabrics since force applied at an angle thereto tends to pull the surfaces apart.

While I have had only hook and pile fabric of the type known as "Velcro" available, it would be possible to use hook and pile fabrics of other fiber compositions and weaves. While I have shown hook or pile belts without a twist in the belt, it is possible to use belts with a twist.

It is obvious that many types of adhesives ranging from glue to rubber or resin or silicate of soda may be used to cement the hook and pile fabrics to the moving members. Pressure sensitive adhesives are recommended for uses where occasional replacement of fabric members is required.

It is obvious that belts and discs may be coated with hook or pile fabric on both sides. Also pulleys may be coated on the rim and sides with hook or pile fabric. Also a belt, disc or pulley may constitute either the driving or the driven member.

Having described certain embodiments of my invention, I now claim:

1. A device for transmission of motion from one component to another, one of said components having a surface with a hook fabric adhered thereto and the other component having a surface faced with a material capable of interengaging with said hook fabric, one of said components transmitting power to the other component by intermittently engaging and disconnecting portions of said fabric and material with each other.

2. A device for transmission of motion, consisting of a driving member and a driven member in operable relation thereto, one of said members having an operating face comprising a hook fabric and the other member an operating face comprising a fabric capable of interengaging with said hook fabric, the two faces being so positioned to cause the fabrics to interengage intermittently one another while in motion.

3. The device of claim 2, in which the driving member is faced with hook fabric and the driven member with pile fabric.

4. A variable speed drive mechanism comprising
   (a) a member having a surface of revolution at an angle to the axis thereof, and
   (b) a second member having a surface forming a cylinder around an axis parallel to an element of the said surface of the first member,
   (c) the respective surfaces being faced with hook and pile fabrics and so positioned that the hook fabric on one has a rolling contact with the pile fabric on the other, and
   (d) means for displacing the cylindrical surface along its axis.

5. A device in accord with claim 1 in which the hook fabric is detachably adhered by a pressure sensitive adhesive.

6. A device for transmission of power from one pulley to another pulley, the two pulleys being out of contact with one another and having axes not in a common plane, said pulleys being faced with hook fabric, and interconnected by a belt of fabric capable of engaging the hook fabric on said pulleys.

7. A device for intermittent transmission of motion at predetermined intervals consisting of a driven member and a continuously moving driving member, the driven member having fabric completely around its periphery, said fabric being capable of engaging with a fabric coating on the driving member and the driving member having a fractional portion of its surface coated with a fabric capable of engaging with the fabric on the driven member, at least one of said fabrics being of the hook type, the remainder of the surface of the driving member being incapable of engaging the driven member to cause it to move.

8. A device for intermittent transmission of power at predetermined intervals consisting of a driven member having a pile fabric completely around its periphery and a driving member having a portion only of its surface consisting of hook fabric for intermittently engaging and disengaging said pile fabric.

References Cited in the file of this patent

UNITED STATES PATENTS

| 2,087,453 | Steder | July 20, 1937 |
| 2,424,873 | Abbrecht | July 29, 1947 |
| 2,941,410 | Ota | June 21, 1960 |
| 2,976,914 | Miller | Mar. 28, 1961 |

FOREIGN PATENTS

| 11,337 | Great Britain | 1887 |
| 10,566 | Great Britain | 1911 |
| 353,095 | France | June 20, 1905 |
| 87,079 | Switzerland | Nov. 1, 1920 |